United States Patent [19]
Kim et al.

[11] Patent Number: 5,171,555
[45] Date of Patent: Dec. 15, 1992

[54] CESIUM IODIDE ALLOYS

[75] Inventors: Hyoun-Ee Kim, Oak Ridge; Arthur J. Moorhead, Knoxville, both of Tenn.

[73] Assignee: The United States of America as represented by the United States Department of Energy, Washington, D.C.

[21] Appl. No.: 645,448

[22] Filed: Jan. 24, 1991

[51] Int. Cl.$^5$ .................. C01D 3/12; C22C 24/00
[52] U.S. Cl. .................. 423/266; 156/DIG. 71; 252/584; 420/400; 423/275; 423/499.1
[58] Field of Search .............. 423/263, 266, 275, 21.1, 423/499; 420/416, 400; 156/DIG. 71; 252/584

[56] References Cited

U.S. PATENT DOCUMENTS 2,727,863 12/1955 Fonda .................. 156/DIG. 71

OTHER PUBLICATIONS

Beutin, B. et al, "A modified Bridgman Furnace for Growing Crystals of α-CsCl", Journal of Crystal Growth vo. 23, No. 4, 1974 pp. 353-355.
V. M. Dobryak, et al "Mechanical Properties of Impure CsI Crystals", (1978) American Institute of Physics, pp. 139-130.
A. A. Urosovskaya, et al "Hardening and Softening of CsI Crystals by Impurities", Soviet Physics-Crystallography, vol. 13, No. 16, Jun. 1969, pp. 899-903.
W. B. Harrison, et al. "The Growth, Characterization and Recrystallization of Alkali Halide Alloyed and Doped KCl", pp. 600-610.
W. W. Durand, et al "Deformation Processing of Cesium Iodide Crystals", pp. 445-462, presented Nov. 18-20, 1974, Tuscan Arizona, by C. R. Andrews, et al. 37

Primary Examiner—John Niebling
Assistant Examiner—Brian M. Bolam
Attorney, Agent, or Firm—Katherine P. Lovingood; Stephen D. Hamel; William R. Moser

[57] ABSTRACT

A transparent, strong CsI alloy havign additions of monovalent iodides. Although the perferred iodide is AgI, RbI and CuI additions also contribute to an improved polycrystalline CsI alloy.

9 Claims, 5 Drawing Sheets

CESIUM IODIDE ALLOYS

This invention relates to a cesium iodide alloy and particularly to a strong, polycrystalline alloy with outstanding multispectral infrared transmittance, and was developed pursuant to a contract with the United States Department of Energy, contract number DE-AC05-84OR21400.

BACKGROUND OF THE INVENTION

Cesium iodide (CsI) is of interest for optical applications because it is the most versatile of all the infrared optical materials, offering transparency from ultraviolet to 60 micrometers wavelengths. However, the poor mechanical properties of single crystal CsI limit its use to relatively small optical components. Significant efforts have been made to improve the mechanical strength of CsI. Introducing divalent impurities such as Mn, Cr, and Ba, into the melt during crystal growth were effective in increasing the strength of single crystal CsI. However, the presence of divalent ions in single crystals has also been shown to be detrimental to transmittance because of the formation in the crystal of defects such as dipoles, precipitates, and aggregates.

Polycrystalline bodies of CsI have been found to have improved mechanical properties as compared to single crystal CsI. One technique to fabricate a polycrystalline body is to introduce subgrains into a single crystal by press forging. Increases in strength were observed in CsI single crystals forged at temperatures between 25° and 200° C. However, the compressive yield strength of the resultant bodies was still relatively low, about 7 MPa. In addition to potential problems such as edge-crack initiation during forging, some researchers have observed that such forged bodies may subsequently undergo primary recrystallization to relieve the strains induced during working, and, of course, recrystallization results in loss of strength in the material.

Another technique to make a polycrystalline body is to hot-press fine powder. However, hot-pressing of alkali halide materials for optical components has generally been avoided because the materials are hygroscopic, making them subject to moisture attack during powder processing. This problem can be alleviated by performing all powder processing and densification operations in a moisture-free environment, such as in a glove box. Polycrystalline CsI that is nine times stronger than single crystal material was fabricated by hot-pressing powder, having and average particle size of about 10 micrometers, at 100° C. for 5 min in a moisture-free atmosphere, However, the transmittance in the extreme long wavelength infrared region (wavelength > 15 micrometers) was about 20% less than that of a single crystal as the result of insufficient densification.

Transmittances equivalent to that of single crystal CsI were obtained in bodies hot pressed at a higher temperature of about 150° C. for a longer period of time, 30 min. In this case, however, the fracture was more modest, about two times that of pure single crystal CsI, due to extensive grain growth that occurred during pressing.

Based on previous observations, there is a need to minimize grain growth in the CsI during hot-pressing in order to attain high mechanical strength, while maximizing densification in order to minimize pores which act as optical scattering centers.

SUMMARY OF THE INVENTION

In view of the above needs, it is an object of this invention to provide a CsI alloy with improved mechanical strength and outstanding multispectral transmittance.

It is another object of this invention to provide a CsI alloy that can be fabricated to maximum density while retaining an ultrafine grain size.

An additional object of this invention is to provide a CsI alloy for use as window material in transmittance of multispectral infrared radiation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the composition of this invention may comprise a CsI alloy having a sufficient amount of a monovalent iodide, other than CsI, to maximize fracture strength while maintaining transparency. The amount preferably would maximize fracture strength from about 16 to about 40 MPa while maintaining at least 10% transparency in the 4 to 50 micrometer wavelength range. The preferred iodide is silver (AgI), but CsI with added copper iodide (CuI) or rubidium iodide (RbI) also exhibits improved properties. It is believed that similar results would be achieved using other monovalent iodides, such as thallium iodide (ThI), that have the same crystal structure as AgI.

DETAILED DESCRIPTION OF THE PREFERRED EMBODIMENT

Figure 1:
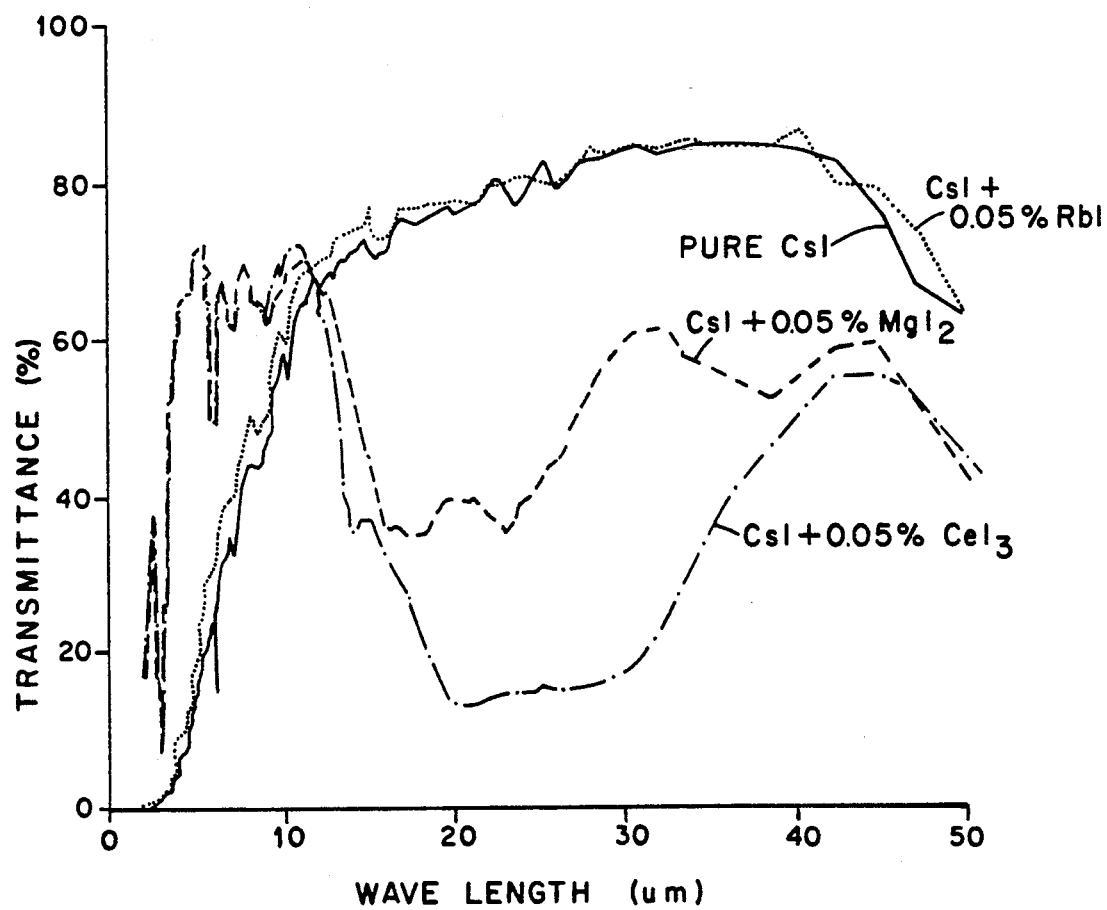
FIG. 1 shows the effect a monovalent iodide, RbI, has on the transmittance of CsI as compared with a divalent iodide, $MgI_2$, or a trivalent iodide, $CeI_3$.

CsI is a very useful optical material combining a low refractive index with excellent multispectral transparency. Unfortunately, the mechanical weakness of single crystal CsI severely limits practical applicability of the material. One approach to overcoming this limitation is to fabricate a polycrystalline body of CsI by densification of fine powder. It is well known that a polycrystalline material is stronger than a single crystal and that the strength increases as the grain size is decreased. Since the smaller the grain size, the stronger the material, the goal of the invention is to minimize grain size in CsI while maintaining transparency. It was theorized that the addition of small amounts of dopants might inhibit grain growth by pinning the grain boundaries to restrict their movement during sintering.

The effect of additions of iodide materials on the mechanical strength and optical transmittance of polycrystalline CsI was investigated. Divalent or trivalent iodides were unsuitable as dopant materials because they tended to decrease transmittance at wavelengths greater than about 15 micrometers, for example in the extreme long wavelength infrared region (XLWIR). qp However, significant increases in transmittance as well as in strength were observed when polycrystalline CsI was doped with small amounts of monovalent iodide materials, especially with AgI. In the case of AgI, the increases in strength and transmittance were attributed to the pinning of grain boundaries. Grain growth was prevented during hot-pressing, resulting in a material having much smaller grains. The maximum fracture strength obtained in this study, in CsI doped with 0.05 mol % of AgI and pressed for 1 hour at 150° C. and a pressure of 103 MPa, was 40 MPa which is about 4 times higher than that of an undoped polycrystalline CsI sample and about 10 times higher than that of pure single crystal CsI. The samples with maximum strength also exhibited the optimum optical transmittance.

The composition and process described in the following example is intended to be illustrative and not in any way a limitation on the scope of the invention. Persons of ordinary skill in the art should be able to envision variations on the general principle of this invention that fall within the scope of the generic claims that follow.

EXAMPLE

All the iodide materials used in these experiments were ultra-pure (purity > 99.999%). Each batch of powders (CsI plus dopant) was carefully weighed and then mixed and ground in a laboratory mill. The mixes were pelletized and then sintered for 15 hours at 200° C. This preliminary sintering operation was conducted to further insure intimate mixing of the constituents and promote the formation of solid solutions up to the solubility limits. To avoid decomposition of the CsI, sintering temperatures higher than 200° C. were not used. The sintered pellets were crushed and reground prior to hot-pressing. All samples were hot-pressed for 1 hour at 150° C. with an applied stress of 103 MPa. Flexure bars, having dimensions of 0.55 cm × 0.635 cm × 2.54 cm, were individually fabricated by hot-pressing in a stainless steel die having a rectangular-shaped cavity. Because the bars took the finish of the polished punch faces, no further sample preparation was required. All powder-processing procedures and hot-pressing operations were performed in a $N_2$ gas purged dry box to avoid moisture attack on the samples.

The strengths of the as-pressed bars were determined at room temperature by 4-point-bend flexure tests at a crosshead speed of 0.008 cm/s. The inner- and outer-spans of the test fixture were 0.635 cm and 1.905 cm, respectively. The average thickness of the samples was 0.55±0.02 cm. In samples of these dimensions, fracture occurred at strains less than 0.2%, making it difficult to determine the yield strengths of the samples. Therefore, the fracture strengths were measured and compared in order to determine the effect of the various dopants. Five to eight flexure bars representative of each dopant material and level, as well as of pure CsI similarly fabricated, were tested. The transmittances of the samples were measured with an infrared spectrophotometer. The microstructures of selected fracture surface were examined by scanning electron microscope (SEM), and the average size and distribution of the grains were determined using an image analyzer.

The effect of dopant material composition (at a level of 0.05 mol %) on the infrared transmittance of the hot-pressed CsI varied depending on the valence of the dopant, as shown in FIG. 1. When the dopant was another monovalent iodide material such as RbI (or, as will be shown later, AgI), the transmittance of the CsI was still high. However, when the dopant was a divalent iodide, such as $CaI_2$ or $MgI_2$, the transmittance of the CsI was significantly lower in the XLWIR region. The decrease in transmittance in this region was even more pronounced when trivalent iodide materials, such as $CeI_3$ or $ErI_3$, were used as dopants. The decrease in transmittance is thought to be due to the formation of defects such as complexes of divalent ion-cation vacancies in the CsI body. It was concluded that only monovalent iodides were suitable as dopant materials; and, therefore mechanical tests were conducted only on samples doped with AgI or RbI.

Figure 2:
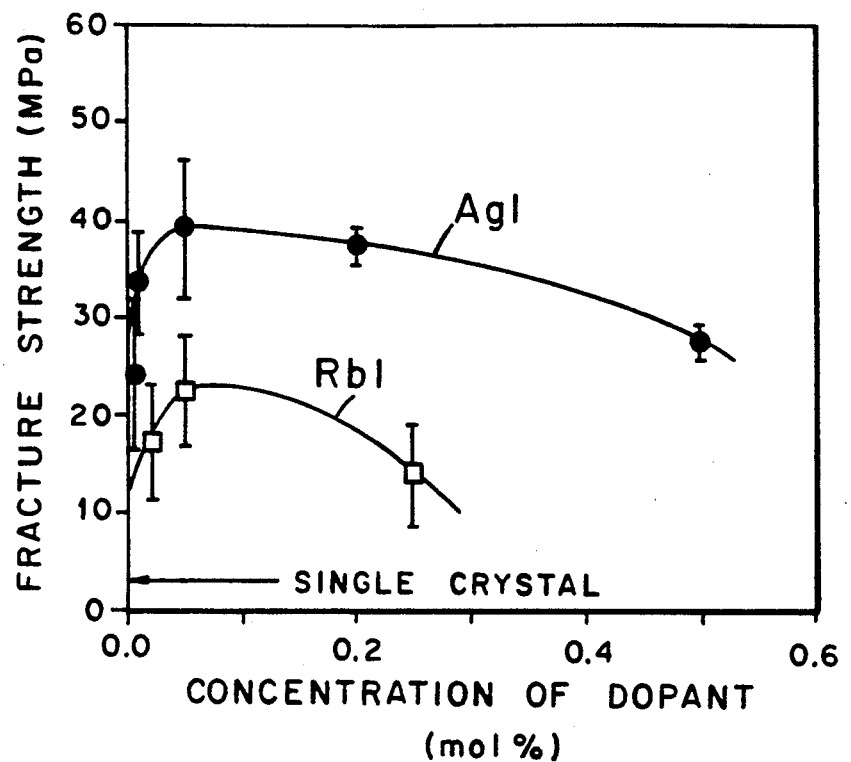
FIG. 2 shows the fracture strengths of hot-pressed CsI doped with various levels of AgI and RbI.

The fracture strengths of hot-pressed CsI doped with various levels of AgI and RbI are shown in FIG. 2. Significant increases in strength were observed for the CsI doped with small amounts of AgI. The strength increased with increasing amounts of AgI up to 0.05 mol %. The maximum strength attained was 40 MPa, which is 4 times higher than that of pure polycrystalline CsI and about 10 times higher than that of a single crystal. With further additions of AgI, the strength decreased slightly. Similar behavior, but to a lesser degree, was observed for samples doped with RbI. This dependency of the strength on the dopant level was well explained when the microstructures of the samples were examined.

When pure CsI powder was hot-pressed for 1 hour at 150° C., extensive grain growth occurred, resulting in an average grain size greater than 100 micrometers. The densification mechanism, and grain growth behavior of pure CsI during hot-pressing were reported previously. Addition of only 0.005 mol % of AgI resulted in a remarkably smaller average grain size. As the amount of AgI added to the CsI was increased to 0.01 mol %, the grain size was even smaller. Therefore, it is apparent that AgI additions are very effective in inhibiting grain growth in polycrystalline CsI during hot-pressing. This restriction of grain growth is attributed to the pinning of the grain boundaries by the dopants, and thereby preventing their movement, as is observed in other ceramic materials. The smallest average grain size (<3 micrometers) in a sample of uniform microstructure was found when the dopant level was 0.05 mol % in the material in which maximum strength was observed. When the dopant level was increased further to 0.2 mol %, the grain size was smaller, but the microstructure also contained random large grains, evidently resulting from the process of secondary recrystallization. The slight decrease in strength observed in CsI with more than 0.2 mol % AgI is believed to be due to the presence of these large grains.

When stress is applied to a CsI single crystal, a small amount of plastic deformation occurs. However, in polycrystalline CsI such plastic deformation is restrained by the grain boundaries, causing local stresses at the grain boundaries. When these stresses become higher than the inherent strength of the material, cracks develop leading to the failure of the material. In the present case, the fracture is predominantly intergranular because of the lack of cleavage planes in CsI crystals and because of insufficient plastic deformation in the grains due to the small grain sizes. Therefore, the strength of the polycrystalline CsI is strongly affected by the grain size of the materials.

Figure 3:
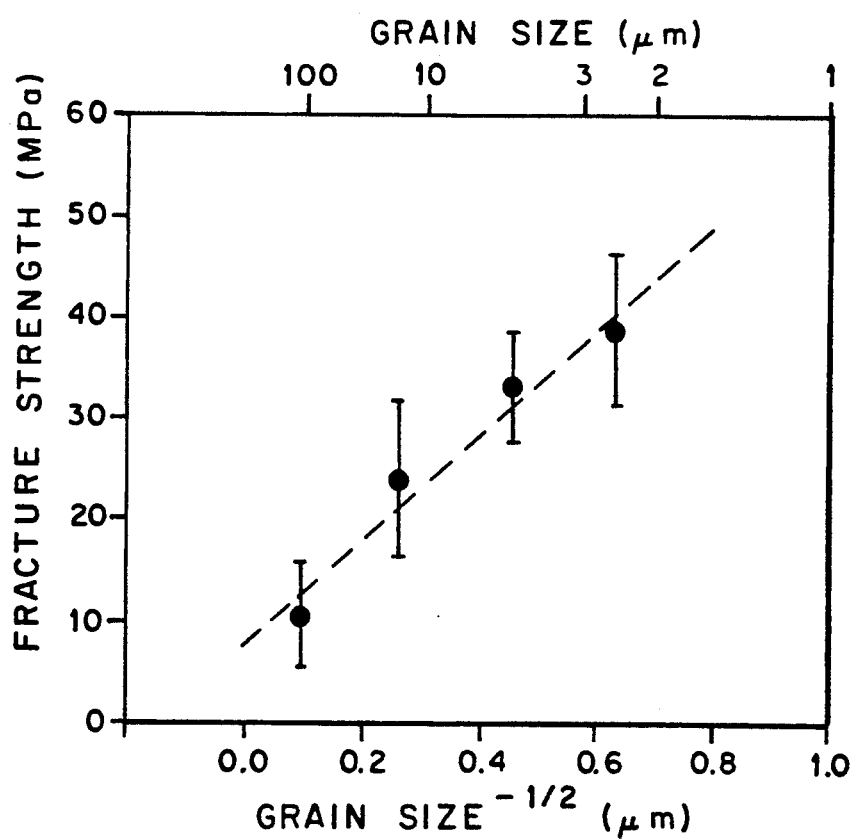
FIG. 3 shows that the fracture strengths of CsI doped with various levels of AgI increases as the gtrain size of the material decreases.

The fracture strengths of the samples doped with various levels of AgI are plotted as a function of the average grain size, according to the Petch relationship, in FIG. 3. The linear relationship between the strength and the inverse of the square-root of the average grain size supports the argument that the strengthening of CsI by AgI additions is due to the inhibition of grain growth during hot pressing.

Additions of RbI also inhibited the grain growth of CsI, but were not as effective as AgI. The observed difference in the efficacy of RbI and AgI additions for inhibiting grain-boundary movement is thought to result from the difference in solubility of these dopants in the CsI. AgI has a different crystal structure, hexagonal, from that of CsI, simple cubic, and, accordingly, has very limited solid solubility in CsI. Therefore, the AgI remains at the grain-boundary regions, where it is very effective in restricting grain-boundary movements during hot-pressing. On the other hand, RbI has a similar crystal structure to that of CsI and forms a solid solution with CsI over a wide composition range. Thus, there is a tendency for the RbI to go into solution during thermal processing, either the preliminary sintering operation at 200° C., or hot pressing at 150° C., making less material available for pinning the grain boundaries during densification.

Figure 4:
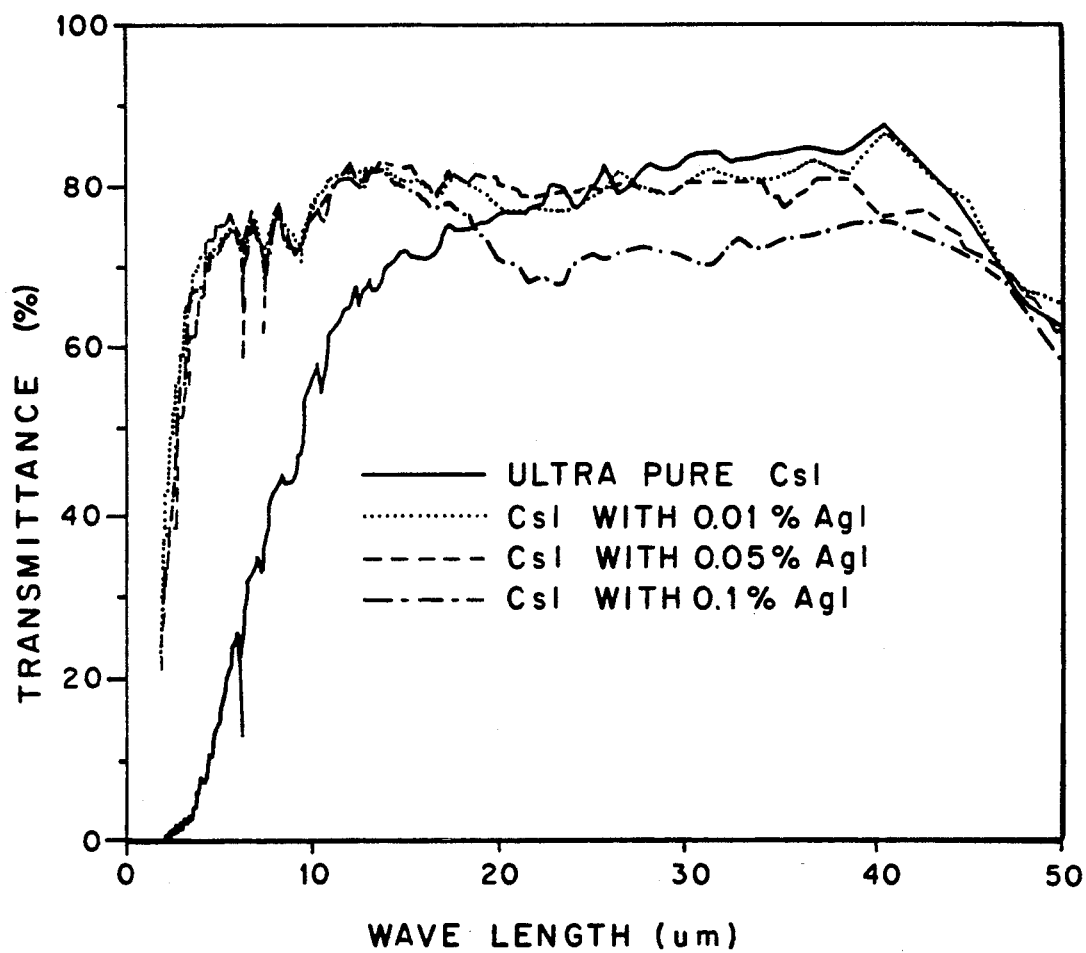
FIG. 4 shows the effect AgI additions have on the transmittance of CsI.

High transmittance is a critical material parameter in infrared-optical components. Consequently, any process that strengthens the material, even to the great extent provided by AgI doping, but significantly sacrifices transmittance, will have limited usefulness. Originally it was expected that AgI additions would reduce the optical properties of CsI to some degree because impurities generally reduce the transmittance of optical materials. However, AgI additions resulted in only slight reductions in the transmittance of the CsI in the XLWIR region (>15 micrometers) and greatly enhanced transmittance in the mid-infrared (3.0-5.0 micrometers) and far-infrared (8-12 micrometers) regions, as shown in FIG. 4. Note that the excellent transmittance of the undoped polycrystalline CsI in the XLWIR region, which is equivalent to that of a single crystal, was essentially equaled up to a dopant level of 0.05 mol % of AgI.

The improved transmittance in the mid- and far-infrared regions is thought to be related to the inhibition of grain boundary migration during hot-pressing. During sintering, any pores that are present often attach themselves to and are subsequently dragged by moving grain boundaries. During such movement, the average pore size is increased by the coalescence of smaller pores. When it reaches a critical size, a pore becomes immobile and is detached as grain boundary migration continues. Such pores will remain inside the grain. The movement of other pores continues until they reach triple points of the grain boundaries, which serve as sinks for the pores. In either case, pores in a sample which has undergone extensive grain growth are likely to be relatively large. In fact, large pores were seen both at the grain boundaries and within the grains in a fracture surface of the pure polycrystalline CsI. The low transmittance of the undoped CsI in the mid- and far-infrared regions is thought to be due to optical scattering at these large pores. Doping with AgI inhibits the movement of the grain boundaries so that any pores present tend to remain isolated rather than undergoing coalescence. Such pores at the grain boundaries also tend to be more readily eliminated because of the higher diffusion rate at that location. Optical scattering is strongly dependent on the size of the scattering sites. Maximum scattering occurs at a scattering site equal in size to the wavelength of the radiation, and decreases as the size of the site becomes substantially less or greater than the wavelength. In the materials doped with AgI, the pores are small with respect to the wavelength of the incident radiation, so that light scattering is minimal. Similar increases in the transmittance in the mid- and far-infrared regions were observed for the samples doped with other iodide materials, such as $MgI_2$, $CeI_3$, as was seen in FIG. 1.

Figure 5:
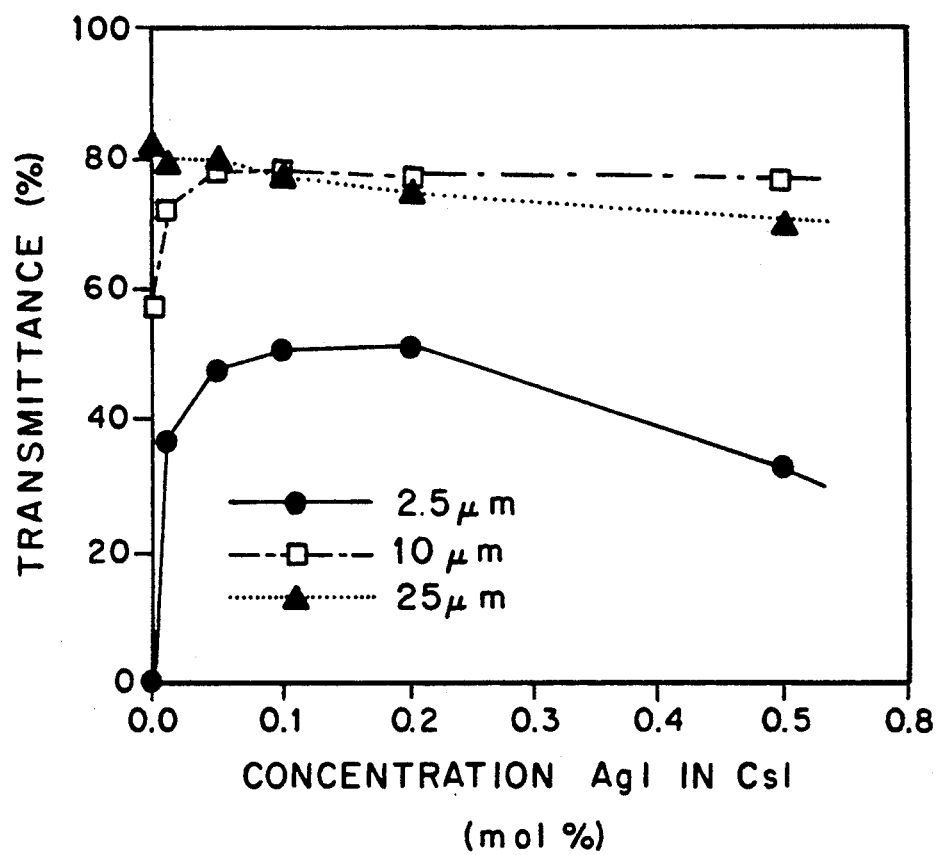
FIG. 5 shows the transmittances of CsI having varying concentrations of AgI at three wavelengths, 2.5, 10, 25 micrometers.

When the level of AgI dopant was greater than 0.1 mol %, the transmittance of the CsI was observed to decrease. The transmittances of the samples at three wavelengths, 2.5, 10, 25 micrometers, as a function of the level of AgI dopant are shown in FIG. 5. According to this graph, the optimum AgI dopant level in CsI is between 0.05 and 0.1 mol %, which is the level that also results in material with the highest fracture strength, FIG. 2. The slight but steady decrease in transmittance in the XLWIR region (wavelength of 25 micrometers) with increasing AgI is thought to be due to the lower intrinsic transmittance of AgI as compared to that of CsI. On the other hand, the decreased transmittance in the mid- or far-infrared regions is thought to be the result of increased scattering from the large pores produced by the secondary grain growth. Of course, these exaggerated grains are also responsible for the observed decreases in average fracture strength of the samples at these dopant levels.

Figure 6:
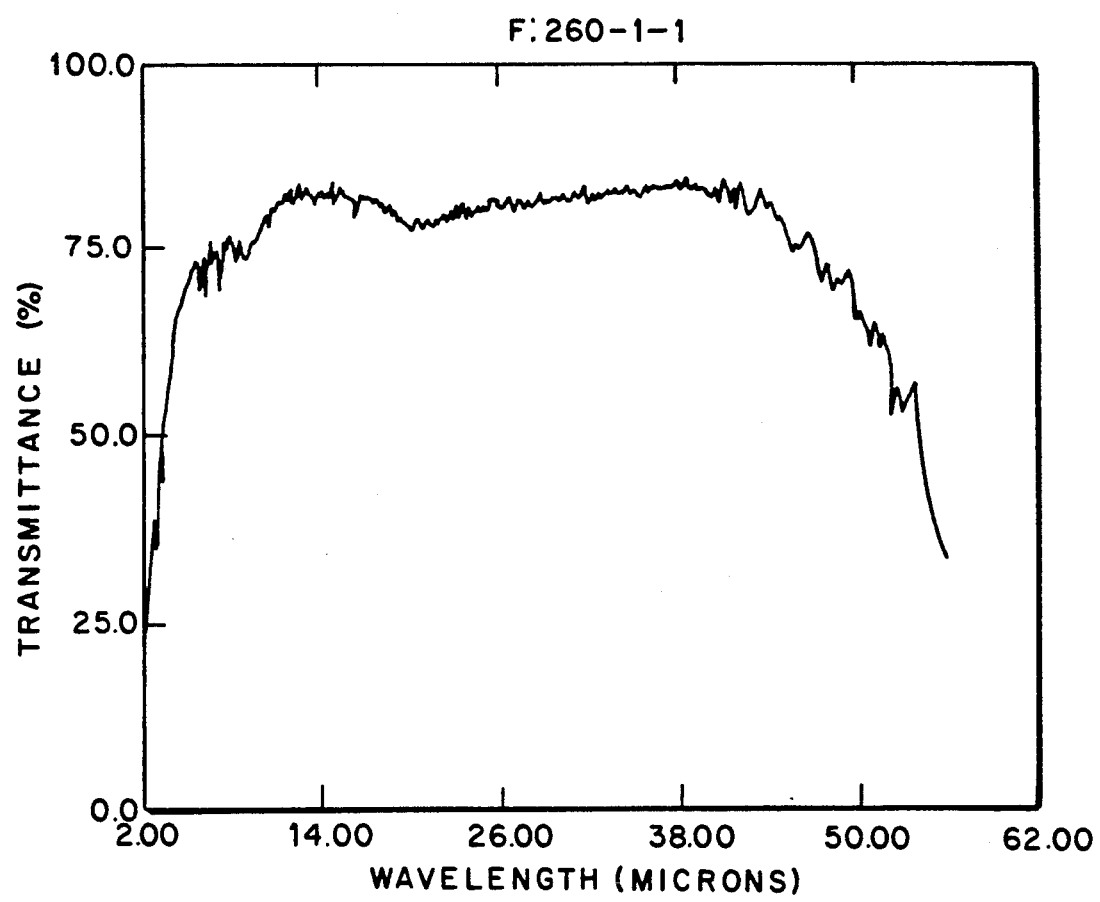
FIG. 6. shows the transmittance of CsI doped with 0.06 mol % of CuI; the flexural strength of this material was 34 MPa.

Similar improvements in strength and transmittance behavior, but to a lesser degree, were observed in CsI samples doped with CuI and RbI. FIG. 6 shows for example, that CsI samples doped with 0.06 mol % CuI has essentially the same transmittance as CsI material doped with 0.05 mol % AgI (FIG. 5). The strength of the CsI material doped with the CuI was excellent, 34 MPa, although somewhat less than that of the material doped with a similar amount of AgI, i.e., 40 MPa. However, iodides of materials having a valence other than one, such as $MgI_2$, $CaI_2$, $CeI_3$, and $ErI_3$, were not suitable as dopants for CsI because they significantly decreased transmittance in the XLWIR region.

We claim:

1. An alloy consisting essentially of CsI and a sufficient amount of a monovalent iodide, other than CsI, to maximize fracture strength and maintain transparency.

2. The alloy of claim 1 wherein said amount maximizes fracture strength in the range of from about 16 to about 40 MPa and maintains at least 10% transparency in the 4 to 50 micrometer wavelength range.

3. The alloy of claim 1 wherein said monovalent iodide is silver iodide.

4. The alloy of claim 1 wherein said monovalent iodide is rubidium iodide.

5. The alloy of claim 1 wherein said monovalent iodide is copper iodide.

6. The alloy of claim 2 wherein said monovalent iodide is present in an amount up to about 0.5 mol %.

7. The alloy of claim 3 wherein said silver iodide is present in amounts up to about 0.5 mol %.

8. The alloy of claim 4 wherein said rubidium iodide is present in amounts up to about 0.5 mol %.

9. The alloy of claim 5 wherein said copper iodide is present in amounts up to about 0.5 mol %.

* * * * *